May 25, 1948.  J. H. REAGIN  2,442,146
BRINE TANK
Filed Sept. 15, 1945
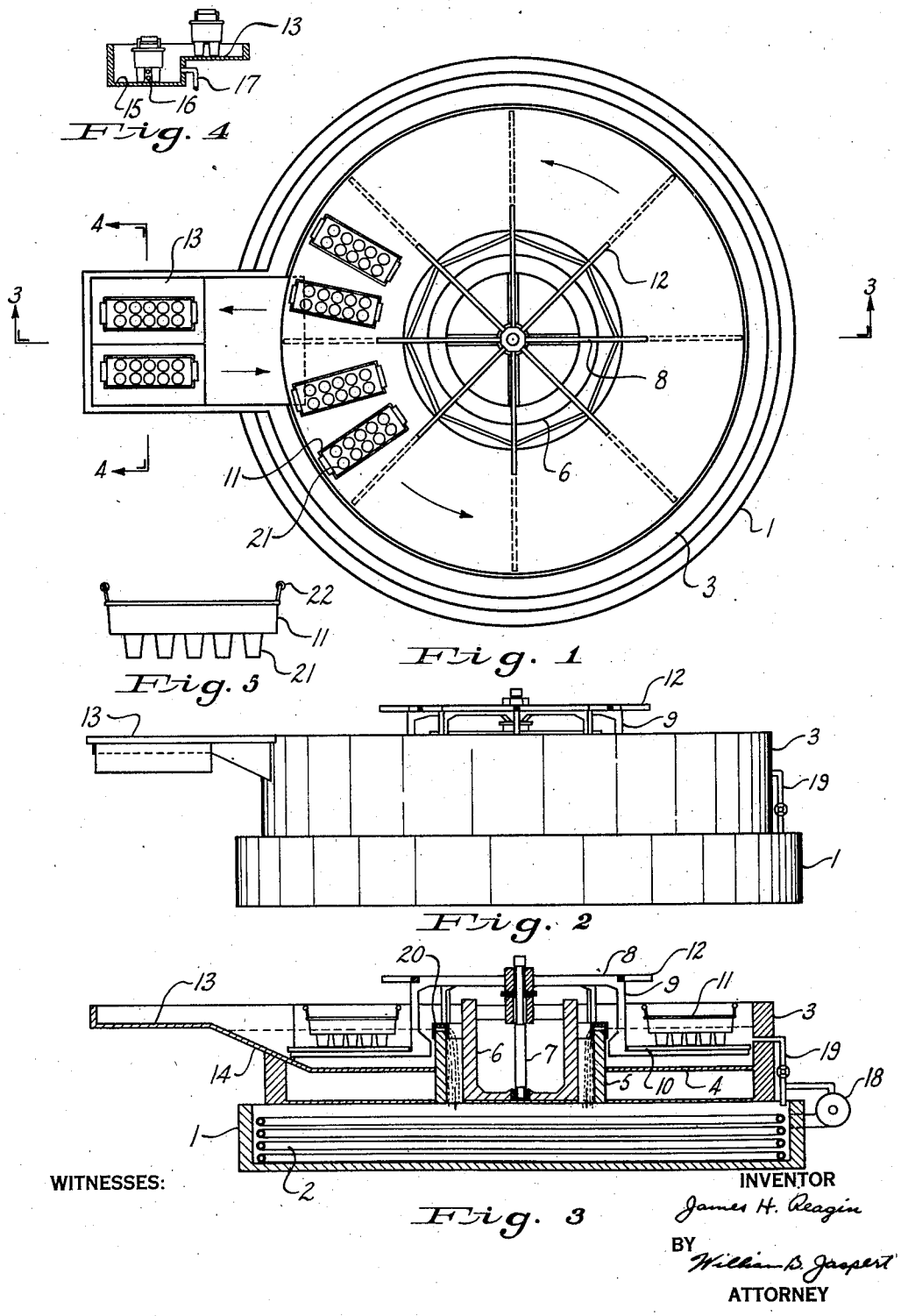

Patented May 25, 1948

2,442,146

UNITED STATES PATENT OFFICE 2,442,146

BRINE TANK

James H. Reagin, Pittsburgh, Pa.

Application September 15, 1945, Serial No. 616,608

3 Claims. (Cl. 62—104)

This invention relates to new and useful improvements in brine tanks for making frozen foods or confections, and it is among the objects thereof to provide a circular brine tank having a rotary support or table of a size to receive a plurality of freezing molds simultaneously which are inserted and removed at a common loading and receiving station, the size of the tank and table being such that the time for travel of the molds from the charging to the discharging stations, which is dependent upon the speed of handling the molds at this point, will be sufficient to freeze the confection in the mold.

Another object of the invention is the provision of a brine tank for frozen food and confections which shall eliminate the wear and tear on the molds to which they are subjected in conventional brine tanks, wherein they are in abutting relation and moved by contact.

These and other objects of the invention will become more apparent from a consideration of the accompanying drawing, constituting a part hereof, in which like reference characters designate like parts, and in which Fig. 1 is a top plan view of a circular brine tank embodying the principles of this invention;

Fig. 2 a side elevational view thereof;

Fig. 3 is a vertical cross-sectional view taken along the line 3—3, Fig. 1;

Fig. 4 a cross-sectional view taken along the line 4—4, Fig. 1; and

Fig. 5 a side elevational view of a mold employed in making frozen foods or confections.

In the drawing numeral 1 designates a brine tank containing freezing coils 2 on which is mounted a working tank 3 having a floor 4 and a central vertical wall 5. Mounted in the center of the working tank is a table support 6 having a vertical shaft 7 with radial arms 8 from which are suspended hangers 9 that support the floor 10 of a rotary table on which the food or confection containers 11 are supported. Arms 8 have extensions 12 that constitute grips for subjecting the table to rotary movement in increments corresponding to the space occupied by the trays 11 as shown in Fig. 1. Instead of the hand movement of the table it may be rotated by a motor drive at a relatively slow speed continuously without interfering with the handling of the trays at the loading platform designated by the numeral 13.

As shown in Fig. 3, the loading station has an inclined surface 14 that terminates with the floor 4 of the rotary table, the loading station having an offset floor portion 15 as shown in Fig. 4, in which is mounted a heating coil 16 and which is provided with an over-flow drain pipe 17 for a purpose to be hereinafter explained. As shown in Fig. 3, brine is circulated from the tank 1 by a pump 18 through a conduit 19 to the working tank above the floor 10 of the rotary table. The level of the brine in the working tank is maintained by the over-flow of the wall 5, the brine being shown in Fig. 3 as flowing over the top of the wall 5 back into the brine tank 1. By the use of a weir 20 which may be adjustably mounted on top of the wall 5, the level can be varied as desired. Also the rate of pumping the brine to the working tank has a controlling effect on the level of the brine.

As shown in Fig. 5, the food containers 11 have a series of cups 21 formed integrally thereon for receiving the food or confection to be frozen. The trays are provided with handles 22 and the charged tray is slid down the incline 14 onto the rotary table floor 10. When the tray has passed through the brine solution through the entire 360° of movement of the table, the confection or food contained therein is frozen and the tray is removed from the rotary table to the loading platform 3. It is then placed on the heating element 16 which defrosts the container sufficiently to remove the frozen food or confection therefrom, which is usually done by means of lifting racks which engage the sticks or other implements frozen in with the food or confection. The lifting of the containers from the working tank carries sufficient brine solution over into the depressed portion 15 to keep it at approximately the level of the cups 21, which is determined by the overflow 17 that returns the excess brine to the working tank or the brine tank.

By means of the above described equipment, the handling of the molds is a simple matter and avoids the pushing of one against the other to convey the molds or containers as in conventional brine tanks, wherein they are placed in end to end relation and pushed through a brining zone. By means of the present invention a substantial saving is effected by the elimination of mold replacement and but one operator is required to handle the brining machine, including the charging and discharging of the molds therefrom.

Although one embodiment of the invention has been herein illustrated and described, it will be evident to those skilled in the art that various modifications may be made in the details of construction without departing from the principles herein set forth.

I claim:

1. Apparatus for making frozen food or confections which comprises a circular tank for a brine solution, means for maintaining said solution at a predetermined level in said tank comprising an annular wall centrally of said circular tank, the top of which is below the top of the outer wall to constitute a spill-way for the brine solution, a rotary table mounted in said tank having a mold supporting surface below the level of said annular inner wall, said table being mounted on a spider journaled for rotary movement and having radial arms constituting gripping members for the operator to subject the table to rotary movement, a wall of said tank forming an extension for receiving confection molds and for discharging molds from said rotary table, and a thawing tank adjacent said mold handling extension for receiving the molds as they are discharged from said brining tank.

2. Apparatus for making frozen food or confections which comprises a brine tank, a working tank mounted above said brine tank and having circulating means for withdrawing brine from the brine tank and delivering it to the working tank, a rotary table mounted on said working tank having a floor above the floor of the working tank for supporting freezing molds thereon, means for rotating said table, and means for maintaining a desired liquid level in said working tank, which latter means comprises an annular over-flow wall having a weir mounted thereon to be adjustable for maintaining a desired brine level in said working tank.

3. Apparatus for making frozen foods or confections which comprises a brine tank having a freezing coil therein, a working tank mounted on the brine tank having a radial extension constituting a loading platform and having an inner annular wall constituting an over-flow for maintaining the level of the brine in the working tank, a rotary table mounted on said working tank having a floor below the top of said annular wall for supporting freezing trays to be conveyed through said working tank from and to said loading platform and a pump for circulating brine from the brine tank to the working tank, said loading platform having a depressed portion and a heating element therein for defrosting the freezing trays to remove the frozen content therefrom.

JAMES H. REAGIN.

REFERENCES CITED

The following references are of record in the file of this patent:

UNITED STATES PATENTS

| Number | Name | Date |
|---|---|---|
| 2,246,941 | Hoyer | June 24, 1941 |

FOREIGN PATENTS

| Number | Country | Date |
|---|---|---|
| 653,725 | Germany | Dec. 1, 1937 |